(12) United States Patent
Wood et al.

(10) Patent No.: US 7,846,572 B2
(45) Date of Patent: Dec. 7, 2010

(54) BATTERY SYSTEM INCLUDING A DEVICE CONFIGURED TO ROUTE EFFLUENT AWAY FROM BATTERY MODULES WITHIN THE BATTERY SYSTEM

(75) Inventors: Steven J. Wood, Shorewood, WI (US); William H. Tiedemann, Cedarburg, WI (US)

(73) Assignee: Johnson Controls Technology Company, Holland, MI (US)

( * ) Notice: Subject to any disclaimer, the term of this patent is extended or adjusted under 35 U.S.C. 154(b) by 51 days.

(21) Appl. No.: 12/167,185

(22) Filed: Jul. 2, 2008

(65) Prior Publication Data

US 2009/0011326 A1 Jan. 8, 2009

Related U.S. Application Data

(63) Continuation of application No. PCT/US2007/000202, filed on Jan. 4, 2007.

(60) Provisional application No. 60/757,068, filed on Jan. 6, 2006.

(51) Int. Cl.
  H01M 2/10 (2006.01)
  H01M 10/50 (2006.01)
  H01M 2/26 (2006.01)
  H01M 6/42 (2006.01)
(52) U.S. Cl. .................. 429/99; 429/100; 429/120; 429/121; 429/159
(58) Field of Classification Search .............. 429/53–56, 429/71, 99, 121
See application file for complete search history.

(56) References Cited

FOREIGN PATENT DOCUMENTS

| EP | 1 091 431 B1 | 4/2001 |
|----|----|----|
| EP | 1 091 431 B1 | 3/2007 |
| WO | WO 2005/043650 A2 | 5/2005 |
| WO | WO 2007/001345 A2 | 1/2007 |

OTHER PUBLICATIONS

International Search Report and Written Opinion for International Application No. PCT/US2007/000202; mailing date May 31, 2007; 8 pages.
International Search Report, for International Application No. PCT/US2007/000202; mailing date May 31, 2007; 2 pages.
International Preliminary Report on Patentability and Written Opinion for International Application No. PCT/US2007/000202; mailing date Jul. 17, 2008; 7 pages.
Office Action for Chinese Patent Application No. 200780001869.6 with English translation, dated Apr. 19, 2010, 6 pages.

*Primary Examiner*—Dah-Wei D Yuan
*Assistant Examiner*—Edu E Enin-Okut
(74) *Attorney, Agent, or Firm*—Foley & Lardner LLP

(57) ABSTRACT

A battery assembly includes a plurality of battery modules, each of the battery modules comprising a plurality of electrochemical cells having a first end comprising a terminal and a second end opposite the first end, the second end comprising an adapter having at least one aperture and arranged such that at least a portion of the adapter is provided in contact with at least a portion of a terminal of an adjacent electrochemical cell. The battery assembly also includes a device that includes at least one member aligned with apertures in a plurality of the adapters to provide a path for effluent escaping the apertures. The device is configured to route effluent from the plurality of battery modules away from the battery assembly.

27 Claims, 9 Drawing Sheets

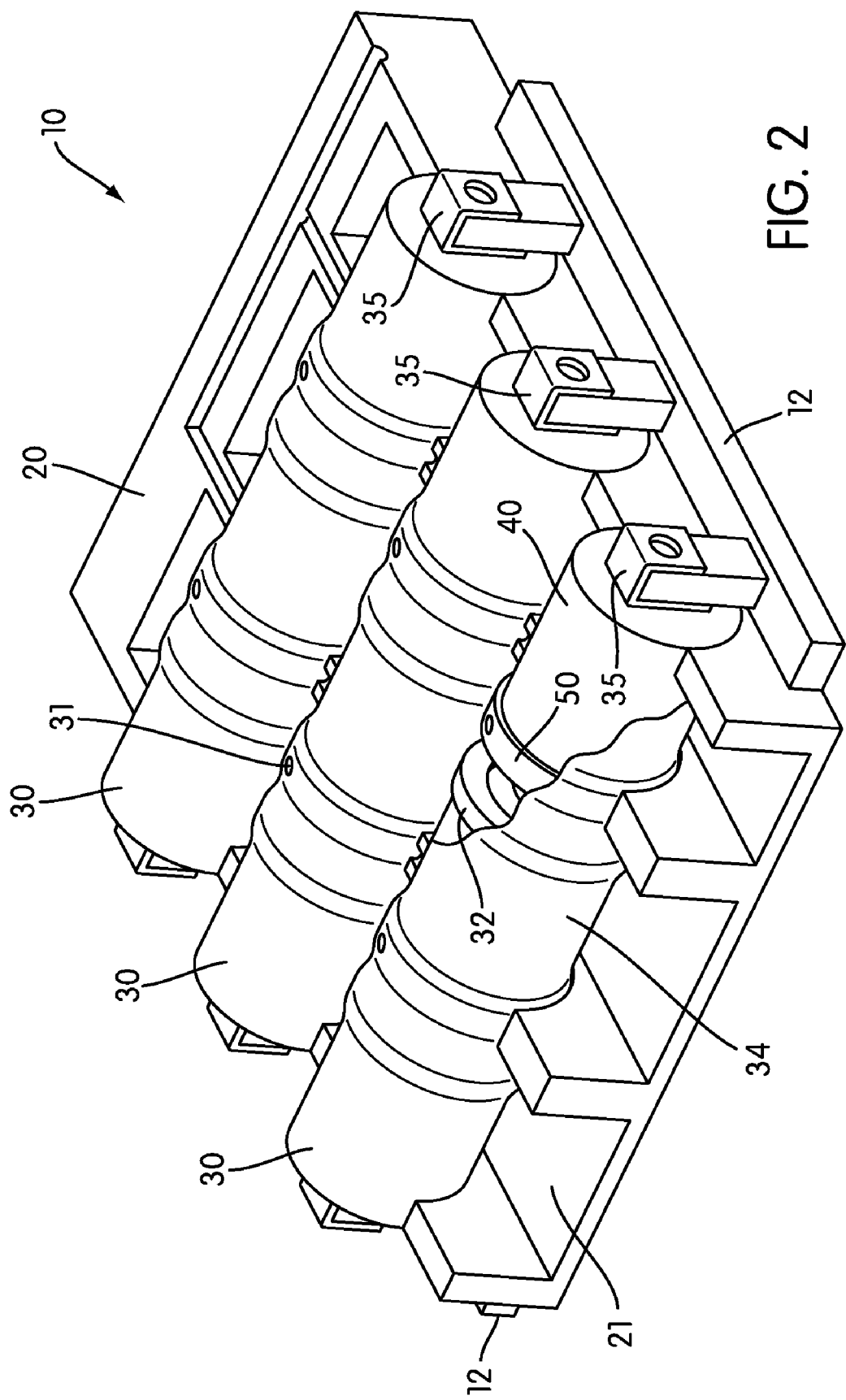

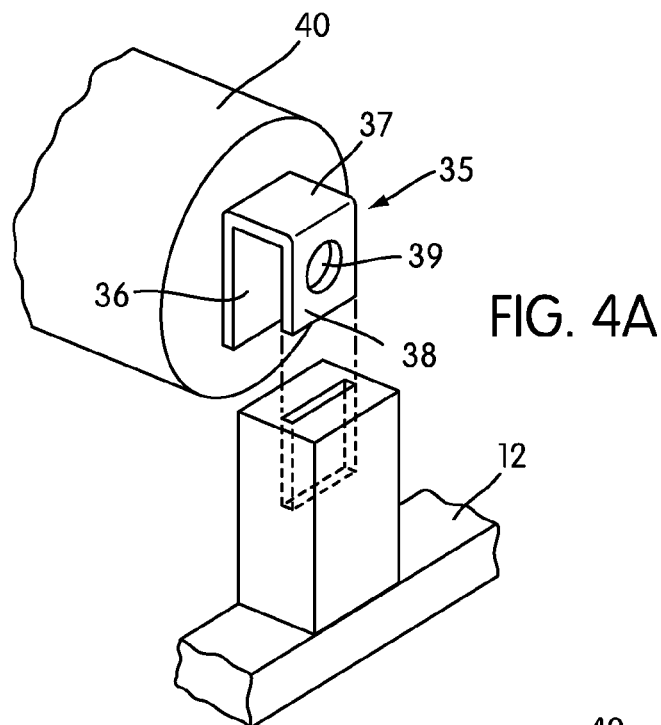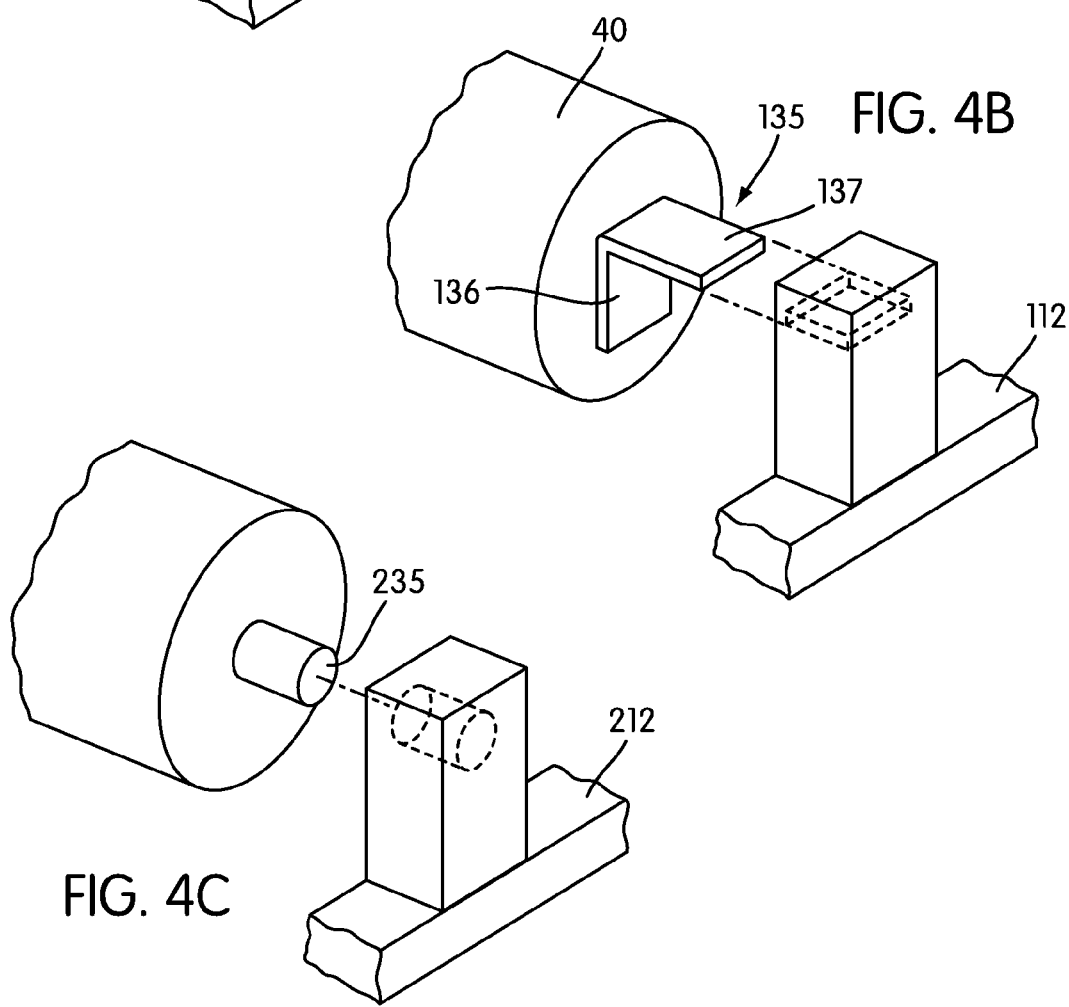

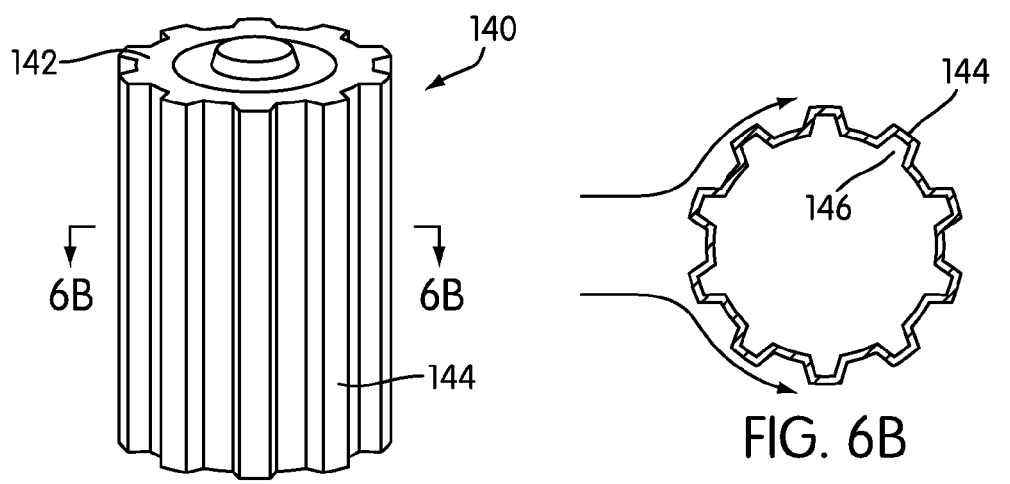
FIG. 6A
FIG. 6B
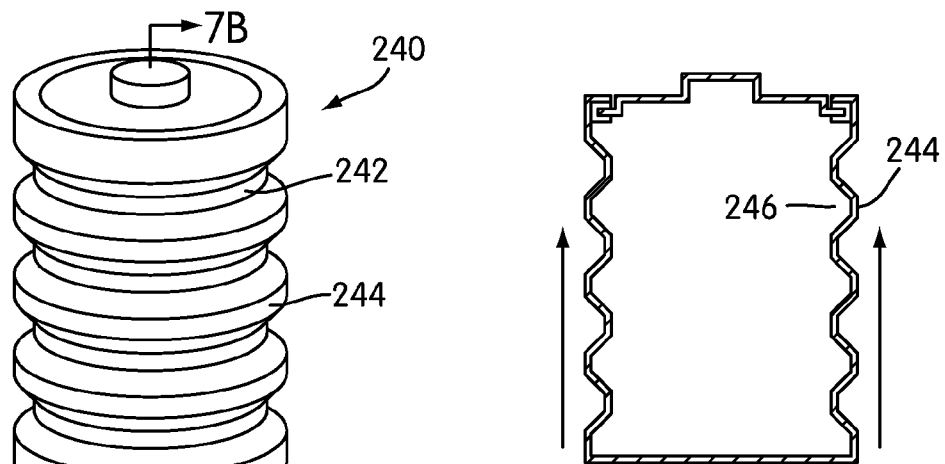
FIG. 7A
FIG. 7B
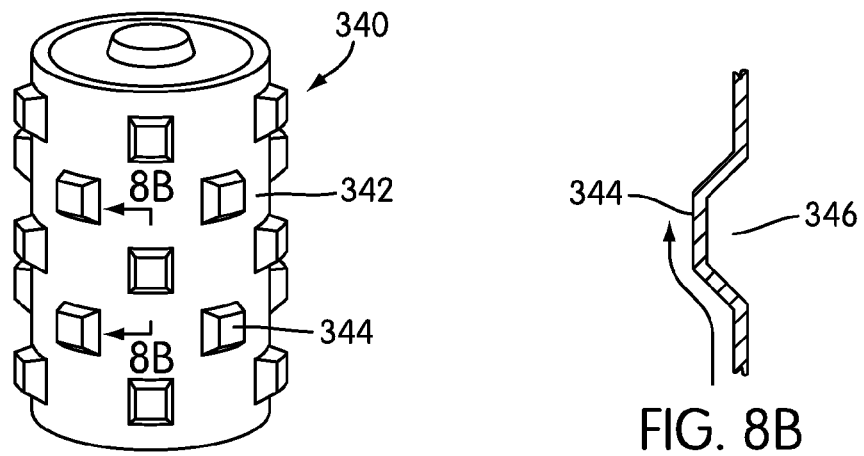
FIG. 8A
FIG. 8B

BATTERY SYSTEM INCLUDING A DEVICE CONFIGURED TO ROUTE EFFLUENT AWAY FROM BATTERY MODULES WITHIN THE BATTERY SYSTEM

CROSS-REFERENCE TO RELATED APPLICATIONS

The present application is a Continuation of International Application PCT/US2007/000202 filed Jan. 4, 2007, which claims the benefit of U.S. Provisional Patent Application No. 60/757,068 filed Jan. 6, 2006. The entire disclosures of International Application PCT/US2007/000202 and U.S. Provisional Patent Application No. 60/757,068 are incorporated by reference herein.

BACKGROUND

The present invention relates generally to the field of batteries and battery systems. More specifically, the present invention relates to a system for packaging, connecting and regulating a plurality of batteries (e.g., in a cell assembly or module).

It is known to provide batteries for use in vehicles such as automobiles. For example, lead-acid batteries have been used in starting, lighting, and ignition applications. More recently, hybrid vehicles have been produced which utilize a battery (e.g., a nickel metal hydride (NiMH) battery) in combination with other systems (e.g., an internal combustion engine) to provide power for the vehicle.

The design and management of a battery system that can be advantageously utilized in a hybrid vehicle may involve considerations such as electrical performance monitoring, thermal management, and containment of effluent (e.g., gases that may be vented from a battery cell).

Lithium-ion batteries have a higher charge density than NiMH batteries (i.e., a lithium-ion battery can be smaller than an equivalent NiMH battery while still holding the same charge), and therefore occupy much less space while accommodating generally similar electrical loads.

It is generally known that lithium-ion batteries perform differently than NiMH batteries. In some applications, it may be desirable to obtain the enhanced power/performance of a lithium-ion battery. For example, lithium-ion batteries may provide greater specific power than NiMH batteries. However, the application of lithium battery technology may present design and engineering challenges beyond those typically presented in the application of conventional NiMH battery technology.

The design and management of a lithium battery system that can be advantageously utilized in a hybrid vehicle may involve considerations such as electrical performance monitoring, thermal management, and containment of effluent (e.g., gases that may be vented from a battery cell).

It would be desirable to provide an improved battery system for use in vehicles. It would also be desirable to provide a system for efficiently and effectively venting effluent from batteries used in the system. It would be desirable to provide a battery system that includes any one or more of these or other advantageous features as will be apparent from the present disclosure.

SUMMARY

An exemplary embodiment of the invention relates to a battery assembly that includes a plurality of battery modules, each of the battery modules comprising a plurality of electrochemical cells having a first end comprising a terminal and a second end opposite the first end, the second end comprising an adapter having at least one aperture and arranged such that at least a portion of the adapter is provided in contact with at least a portion of a terminal of an adjacent electrochemical cell. The battery assembly also includes a device that includes at least one member aligned with apertures in a plurality of the adapters to provide a path for effluent escaping the apertures. The device is configured to route effluent from the plurality of battery modules away from the battery assembly.

Another exemplary embodiment of the invention relates to a battery assembly that includes a plurality of battery modules, each battery module comprising a plurality of electrochemical cells arranged end to end such that a terminal of each electrochemical cell is in contact with an adapter coupled to an end of an adjacent electrochemical cell, the adapter comprising at least one aperture for allowing effluent to escape the electrochemical cell to which it is coupled. The battery assembly also includes a manifold provided adjacent the plurality of battery modules for routing effluent from electrochemical cells in each of the plurality of modules. The manifold includes at least one member having features aligned with the apertures of a plurality of the adapters. The manifold is configured to route effluent away from the battery assembly.

Another exemplary embodiment of the invention relates to a battery assembly that includes a plurality of battery modules, each of the battery modules comprising a plurality of electrochemical cells arranged end to end to form cell sticks and a plurality of openings for allowing effluent to escape the battery modules, the openings provided in adapters coupled to ends of the plurality of electrochemical cells. The battery assembly also includes a device for routing effluent from the battery modules to a location away from the battery assembly. The device includes features aligned with the openings in the plurality of battery modules to allow the effluent to flow into the manifold.

BRIEF DESCRIPTION OF THE DRAWINGS

FIG. 2 is a perspective view of a battery assembly having a plurality of battery modules according to an exemplary embodiment.

FIG. 4A is a partial perspective view of the battery module shown in FIG. 3A showing an endplate according to an exemplary embodiment.

FIG. 4B is a partial perspective view of the battery module shown in FIG. 3A showing an endplate according to another exemplary embodiment.

FIG. 4C is a partial perspective view of the battery module shown in FIG. 3A showing an endplate according to another exemplary embodiment.

FIG. 6A is a perspective view of a battery or cell according to an exemplary embodiment.

FIG. 6B is a section view of the cell in FIG. 6A taken along line 6B-6B.

FIG. 7A is a perspective view of a cell according to an exemplary embodiment.

FIG. 7B is a section view of the cell in FIG. 7A taken along line 7B-7B.

FIG. 8A is a perspective view of a cell according to an exemplary embodiment.

FIG. 8B is a partial section view of the cell in FIG. 8A taken along line 8B-8B.

DETAILED DESCRIPTION

Figure 1A:
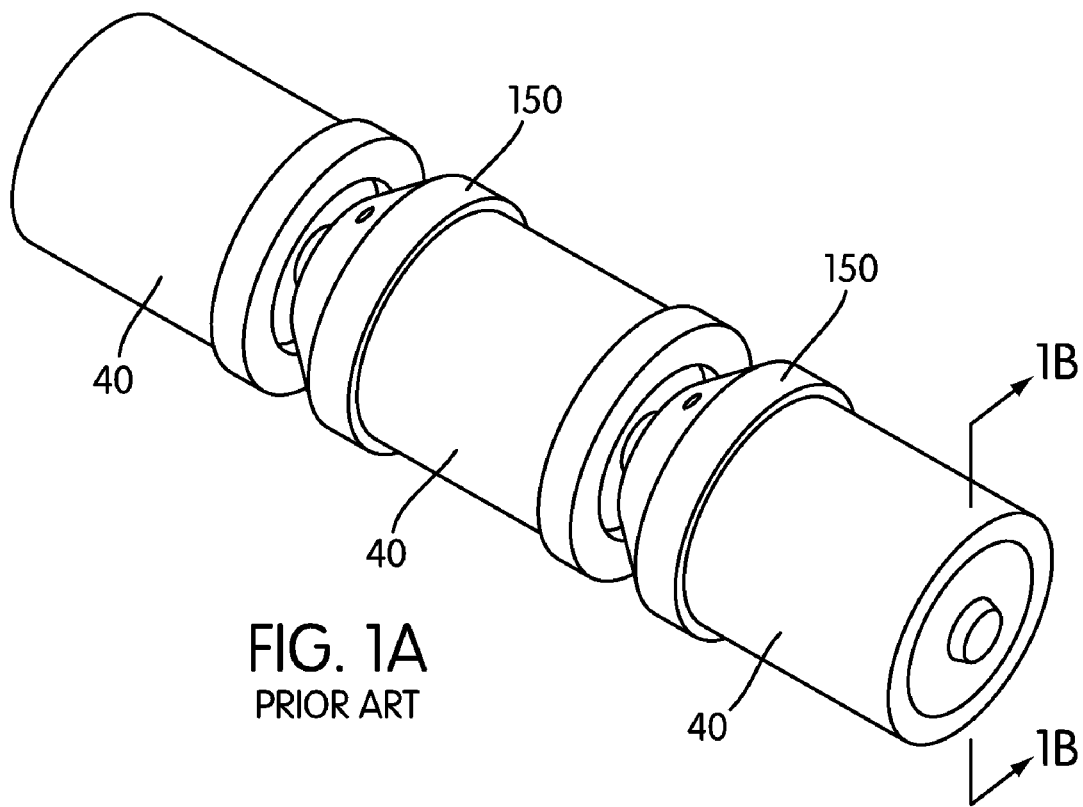
FIG. 1A is a perspective view of a known battery module for use in a battery assembly.
Figure 1B:
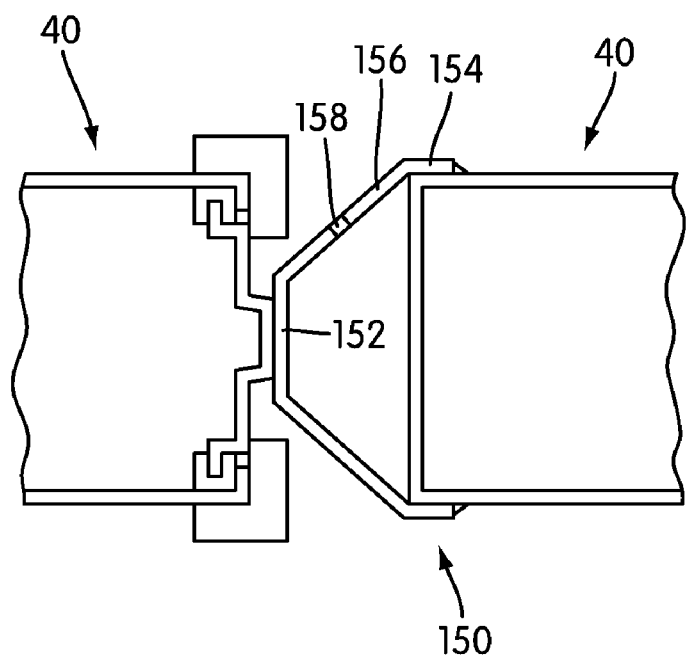
FIG. 1B is a partial section view of the module shown in FIG. 2A taken along line 1B-1B.

FIGS. 1A and 1B illustrate a battery module comprising a plurality of batteries or cells 40 according to a known embodiment. Cells 40 are coupled with cone-shaped adapters 150. Adapters 150 comprise an end face 152, a cylindrical portion 154, a sloped portion 156, and a vent hole 158. End face 152 is coupled to an end face 44 of one cell 40 while cylindrical portion 154 receives and is coupled to the casing 42 of another cell 40. Sloped portion 156 connects end face 152 and cylindrical portion 154 and allows electrical current to flow between end face 152 and cylindrical portion 154.

An opening or aperture in the form of a vent hole 158 (e.g., slot, outlet, etc.) is provided in sloped portion 156 and allows effluent (e.g., gases) to be released from cell 40 to escape the space formed by adapter 150. One difficulty with the arrangement illustrated in FIGS. 1A and 1B is that effluent gases escaping the cells commingle with the air surrounding the battery module, rather than venting from the vehicle. It would be desirable to keep the effluent gases separate from the surrounding air and to vent them outside the vehicle.

Figure 9:
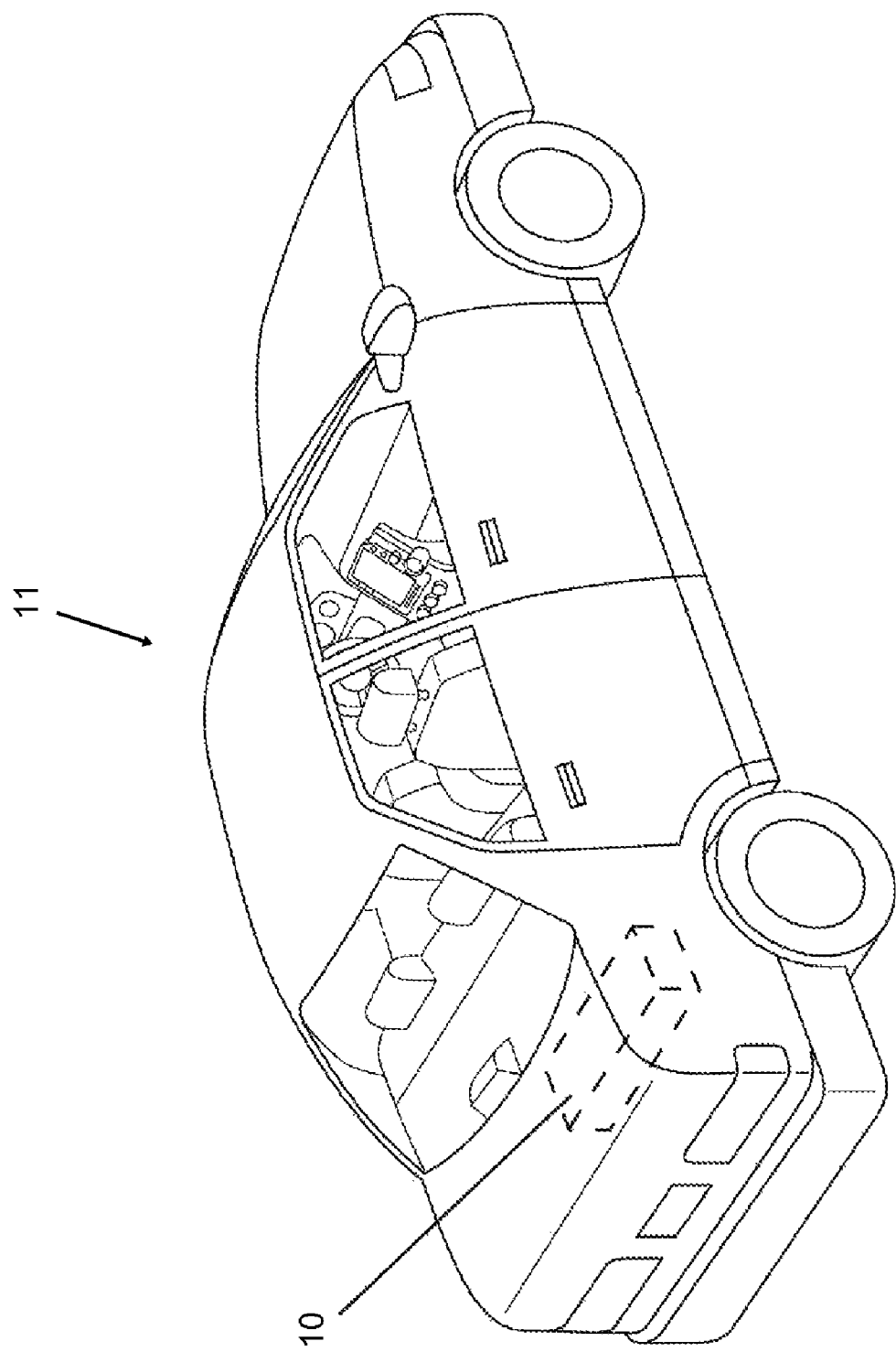
FIG. 9 is a perspective view of a vehicle having a battery module provided therein according to an exemplary embodiment.

FIG. 2 illustrates a battery assembly 10 according to an exemplary embodiment. Battery assembly 10 is intended to be provided in a vehicle 11 (see, e.g., FIG. 9) and comprises a tray 20, end plates 12, and a plurality of battery modules 30. Tray 20 comprises a bottom portion or half 21 and a top portion or half 22 (FIG. 5A), and is configured to house or contain modules 30. End plates 12 are configured to be conductively coupled with terminals 35 of modules 30.

Each module 30 includes a plurality of cells 40 (e.g., NiMH cells), adapters 50, insulating rings 32, a sleeve 34 (shown as being partially removed in FIG. 2), and terminals 35. According to an exemplary embodiment, the cells making up the modules are arranged end to end to form a stick or linear arrangement of cells. According to an exemplary embodiment, battery assembly 10 includes three modules 20, each of which includes three batteries or cells 40. While the embodiment shown in FIG. 2 illustrates modules 30 having three cells 40, it should be understood that a different number of cells may be utilized in each of the modules (e.g., four or more cells, etc.). Additionally, it should be understood that according to other exemplary embodiments, a battery assembly may include a different number of modules (e.g., a greater or lesser number of modules than shown in the accompanying FIGURES). Additionally, while the cells shown in FIG. 2 are shown as having a generally cylindrical shape, according to other exemplary embodiments, cells could take other forms (e.g., oval, prismatic, etc.). According to still other exemplary embodiments, cells could be lithium-ion, nickel cadmium or any other suitable electrochemical cells.

Figure 3A:
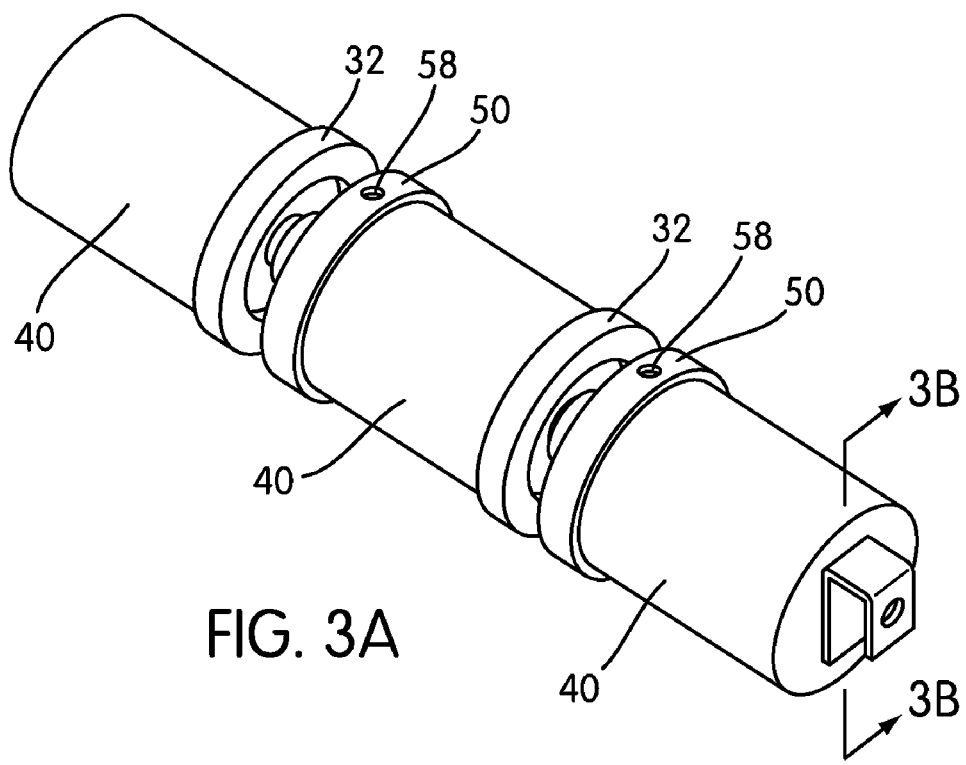
FIG. 3A is perspective view of a battery module utilized i the battery assembly shown in FIG. 2.
Figure 3B:
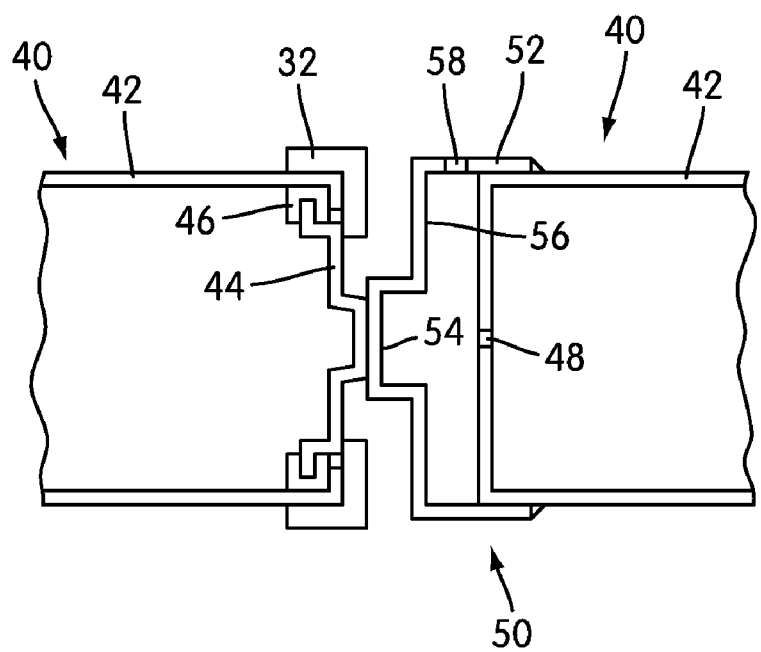
FIG. 3B is a partial section view of the battery module shown in FIG. 3A taken along line 3B-3B.

According to an exemplary embodiment, cells 40 are generally cylindrical NiMH cells and are configured to store and deliver an electrical charge. As shown in FIGS. 2 and 3A-3B, cells 40 include a housing or casing 42, an endplate or cover 44, an insulating ring 46, and a vent 48 (e.g., an opening, aperture, slot, etc.). Casing 42 is a generally hollow body (e.g., a shell, covering, sleeve, etc.) that serves as a container for internal components (e.g., at least one negative electrode or anode, at least one positive electrode or cathode, separators, electrolyte, etc.) of cell 40 and defines the shape of cell 40. According to an exemplary embodiment, casing 42 may serve as one terminal (negative or positive) of cell 40.

Endplate 44 is a generally flat body that serves as one end of cell 40 and one terminal (negative or positive) of cell 40. Insulating ring 46 is a generally non-conductive member that is coupled between casing 42 and endplate 44 and reduces the chance of cell 40 short-circuiting (i.e., by casing 42 of cell 40 contacting end plate 44 of cell 40). Vent 48 allows a controlled release of pressure and gas if cell 40 fails, reducing the chance of casing 42 rupturing.

Referring to FIGS. 3A and 3B, a module 30 is shown according to an exemplary embodiment. Cells 40 are coupled or connected together with adapters 50. Adapters 50 include a cylindrical portion 52, a raised portion 54 (e.g., a protrusion or extension), an end face 56, and a vent hole 58. Cylindrical portion 52 receives and is coupled to the casing 42 of cell 40 while raised portion 54 is coupled to end face 44 of an adjacent cell 40. End face 56 connects raised portion 54 and cylindrical portion 52 and allows electrical current to flow between raised portion 54 and cylindrical portion 52. Vent hole 58 is an opening (e.g., slot, aperture, space, outlet, etc.) in cylindrical portion 52 and allows any effluent (e.g., gases) released from cell 40 to escape the space formed by adapter 50.

Insulating ring 32 is a generally non-conductive member that is coupled to cell 40 and reduces the chance of module 30 short-circuiting (i.e., by casing 42 of one cell 40 contacting an adapter 50 coupled to an adjacent cell 40).

Sleeve 34 (FIG. 2) is a generally non-conductive component that insulates casings 42 from the environment and reduces the chance of electrical shock. Sleeve 34 comprises a plurality of openings 31 (e.g., slots, holes, apertures, etc.) that correspond with vent holes 58 on adapters 50.

Referring now to FIGS. 4A-4C, terminals for the modules are shown according to various exemplary embodiments. Such terminals are provided as conductive members that are intended to mechanically and electrically couple the module to an end plate. In the illustrated exemplary embodiments of FIGS. 4A-4C, terminals 35, 135, 235 are male-type connectors that are inserted into an opening (e.g., aperture, slot, etc.) to connect to end plate 12 of the cell. Referring to FIG. 4A and according to one exemplary embodiment, terminal 35 is a generally flat member or element that is bent or formed into a generally U-shaped profile. Terminal 35 comprises a back portion 36, a top portion 37, a front portion 38, and an aperture or hole 39. According to an exemplary embodiment, back portion 36 is welded to endplate 44 of a cell 40 on the distal end of module 30. Hole 39 is an opening (e.g., slot, aperture, etc.) in front portion 38. Hole 39 is provided to allow access to back portion 36 for a welding process. According to other exemplary embodiments, back portion 36 could be coupled to endplate 44 of cell 40 in any other suitable manner that forms a conductive connection. Front portion 38 is configured to engage a conductive member or receptacle on end plate 12.

Referring now to FIG. 4B and according to another exemplary embodiment, terminal 135 is a generally flat member or element that is bent or formed into a generally L-shaped profile and comprises a back portion 136 and a top portion 137. According to an exemplary embodiment, back portion 136 is welded to end plate 44 of a cell 40 on the distal end of module 30. According to other exemplary embodiments, back portion 136 could be coupled to endplate 44 of cell 40 in any other suitable way that forms a conductive connection. Top portion 137 is configured to engage a conductive member or receptacle on endplate 112.

Referring now to FIG. 4C and according to another exemplary embodiment, terminal 235 is a generally cylindrical member or element (e.g., an extension) provided coaxial with module 30. According to an exemplary embodiment, terminal 235 is welded to or formed on end plate 44 of cell 40 on the distal end of module 30. According to other exemplary embodiments, terminal 235 could be coupled to endplate 44 of cell 40 in any other suitable way that forms a conductive connection. Terminal 235 is configured to engage a conductive member or receptacle on endplate 212.

One advantageous feature of the embodiments illustrated in FIGS. 4A-4C is that the terminals may be welded (e.g., laser welded) to the end plates and to a conductive member or receptacle on an endplate, thus reducing the overall number of parts required in the battery assembly and increasing the speed of assembly (and, concurrently, reducing the necessary labor costs associated with the assembly). Each of the cells within a module may be laser welded together, for example. According to another exemplary embodiment, individual cells may be coupled together without welding. According to yet another exemplary embodiment, the terminals may not be welded to the end plates (e.g., they may be secured by other means such as fasteners, snap-fit, etc.).

Figure 5A:
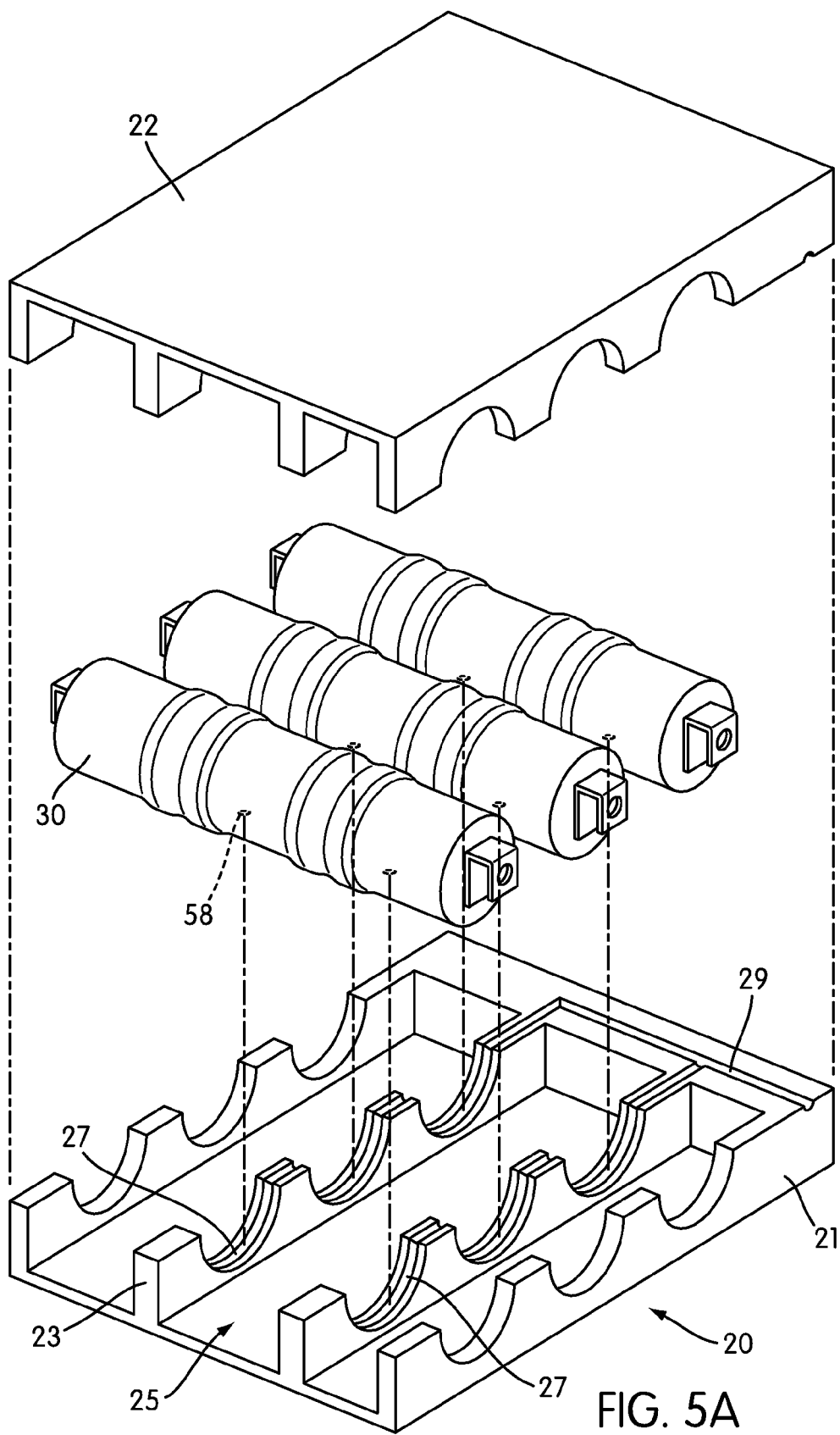
FIGS. 5A-5C are perspective view of a battery assembly and a vent manifold according to several exemplary embodiments.
Figure 5B:
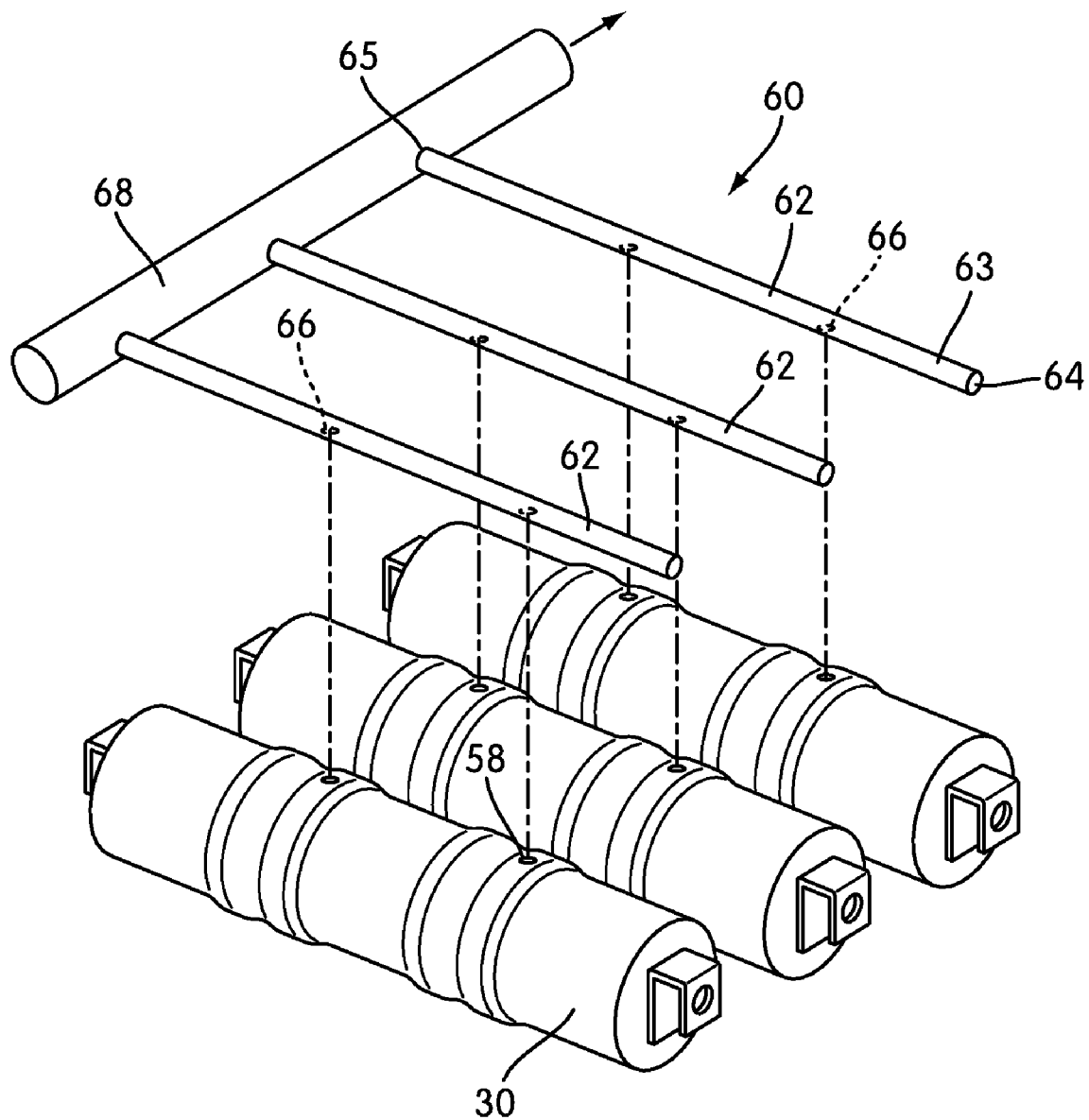
Figure 5C:
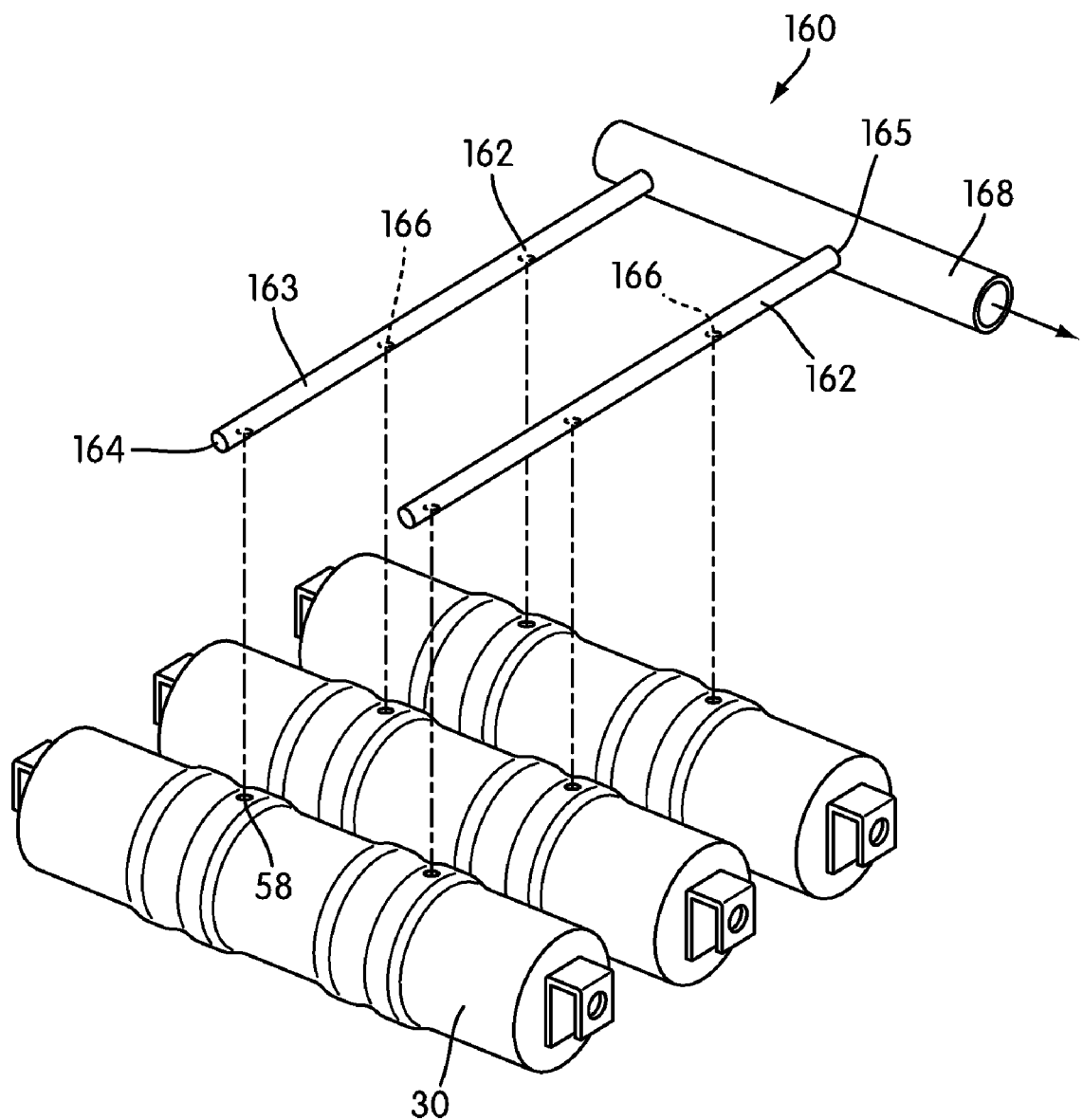

Referring now to FIGS. 5A-5C, a manifold that may be incorporated in a battery assembly such as that shown in FIG. 2 is shown according to various exemplary embodiments. As used herein, the term "manifold" is intended as an assembly of components (e.g., pipes, tubes, hoses, channels, etc.) that are configured to collect vent effluent (e.g., gases) from the cells and to vent such effluent for release outside of the vehicle.

One exemplary embodiment of a manifold is shown in FIG. 5A. A structure includes a tray 20 that comprises a series of raised members or elements 23 (e.g., walls, partitions, supports, ribs, etc.), substantially parallel air spaces 25, substantially parallel channels 27, and an end channel 29. According to an exemplary embodiment, bottom portion or half 21 and top portion or half 22 of tray 20 are symmetrical (according to other exemplary embodiments, the top and bottom portions may be asymmetrical). Members 23 are configured to receive and support modules 30 thereon. Air spaces 25 are generally parallel spaces that are oriented substantially perpendicular to modules 30 and provide a space for cooling air. Channels 27 are depressions (e.g., conduits, grooves, troughs, etc.) formed in members 23 between air spaces 25 and correspond to vent holes 58 in adapters 50 (as shown in FIG. 5A, the vent holes 58 are on the underside of the battery modules 30 and are aligned with the bottom of the depressions formed in the members when the modules are put in place; according to other exemplary embodiments, the vent holes may align with the channels at different points along the depression). End channel 29 is a depression (e.g., conduit, groove, trough, etc.) that runs generally perpendicular to channels 27 and is coupled to channels 27 to form a continuous, generally sealed volume between vent holes 58 on adapters 50 and the exterior environment. According to other alternative embodiments, tray 20 could include a gasket component that is configured to increase the seal between the two halves of tray 20 and generally isolate an effluent gases from the cooling air.

Another exemplary embodiment of a manifold is shown in FIG. 5B. Manifold 60 comprises a plurality of members or elements 62, 68 (e.g., tubes, channels, etc.). Members 62 are generally hollow members (e.g., pipes, hoses, tubes, etc.) that are configured to couple with modules 30 to receive any effluent gases from cells 40 and are oriented parallel to modules 30. According to an exemplary embodiment, members 62 comprise a body 63, a closed end 64, an open end 65 in communication with the hollow body 63, and a plurality of openings 66 (as shown in FIG. 5B, the openings 66 are provided on the underside of the members 62). According to an exemplary embodiment, the bodies 63 are generally cylindrical and form the side walls of the members. Closed ends 64 and open ends 65 are on opposite distal ends of the members 62. Openings 66 (e.g., holes, slots, apertures, etc.) correspond to vent holes 58 on adapters 50. The member 68 (e.g., the base for the manifold) is a generally hollow component (e.g., tube, pipe, hose, duct, etc.) that is coupled to open ends 65 of the members 62 to form a continuous, generally sealed volume between vent holes 58 on adapters 50 and the exterior environment.

Another exemplary embodiment of a manifold is shown in FIG. 5C. Manifold 160 comprises a plurality of members 162, 168 (e.g., pipes, hoses, tubes, etc.). Tubes 162 are generally hollow members that are configured to couple with modules 30 to receive any effluent gases from cells 40 and are oriented perpendicular to modules 30. According to an exemplary embodiment, members 162 comprise a body 163, a closed end 164, an open end 165 in communication with the hollow body 163, and a plurality of openings 166 (as shown in FIG. 5C, the openings 166 are provided on the underside of the members 162). According to an exemplary embodiment, the bodies 163 are generally cylindrical and form the side wall of the tube 132. Closed ends 164 and open ends 165 are on opposite distal ends of member 162. Openings 166 (e.g., holes, slots, apertures, etc.) correspond to vent holes 58 on adapters 50. The member 168 (e.g., a base) is a generally hollow component (e.g., tube, pipe, hose, duct, etc.) that is coupled to open ends 165 of members 162 to form a continuous, generally sealed volume between vent holes 58 on adapters 50 and the exterior environment.

While the exemplary embodiments shown in FIGS. 2 through 5C illustrate batteries or cells having relatively smooth exterior surfaces, FIGS. 6A to 8D illustrate batteries or cells according to other exemplary embodiments. Typical hybrid electric vehicle batteries are cooled with generally laminar airflow. According to an exemplary embodiment, irregular contours (e.g., dimples, creases, channels, etc.) are added to either the cell or to a separate container for the cell that are intended to cause turbulent airflow and increase heat transfer properties of the cells. According to an exemplary embodiment in which such contours are hollow inside, such contours may advantageously increase the interior volume of the cell, which may be used to increase the volume of the electrolyte reservoir and the life of the cell.

Referring to FIGS. 6A and 6B and according to one exemplary embodiment, cell 140 comprises a casing 142 with a series of projections 144 (e.g., ridges, ribs, protrusions, etc.) that are configured to increase the turbulence of cooling air flowing over cells 140 and run generally parallel to the axis of cell 140. Projection 144 defines an interior volume 146 that allows additional electrolyte to be housed within cell 140 (e.g., which may act to increase the life of the cell by avoiding drying off of the separator). According to an exemplary embodiment, projections 144 have a generally rhomboid cross-section. According to other exemplary embodiments, other configurations for the projections may be utilized (e.g., cross-sections that may be semicircular, square, rectangular, triangular, etc.).

Referring now to FIGS. 7A and 7B and according to another exemplary embodiment, cell 240 comprises a casing 242 with a series of projections 244 (e.g., ridges, ribs, protrusions, etc.) that are configured to increase the turbulence of cooling air flowing over cells 240 and run generally perpendicular to the axis of cell 240. Projection 244 defines an interior volume 246 that allows additional electrolyte to be housed within cell 240. According to an exemplary embodiment, projections 244 have a generally rhomboid cross-section. According to other exemplary embodiments, other configurations for the projections may be utilized (e.g., cross-sections that may be semicircular, square, rectangular, triangular, etc.).

Referring to FIGS. 8A and 8B and according to another exemplary embodiment, cell 340 comprises a casing 342 with a series of projections 344 (e.g., knobs, protrusions, etc.) that are configured to increase the turbulence of cooling air flowing over cells 340 and extend outward from casing 342. Projection 344 defines an interior volume 346 that allows additional electrolyte to be housed within cell 340. According to an exemplary embodiment, projections 344 have a generally rhomboid cross-section. According to other exemplary embodiments, other configurations for the projections may be utilized (e.g., cross-sections that may be semicircular, square, rectangular, triangular, etc.).

While FIGS. 6A-8B illustrate cells having projections formed as a part of the casing, according to other exemplary embodiments, the projections could be provided as features of a cover that houses the modules (e.g., a corrugated plastic cover with shrink wrap provided over it). In this manner, the projections could be used to produce turbulent airflow without an alteration of the otherwise generally smooth outer surface of the cells (although it should be noted that providing projections on the cover as opposed to the cell itself will not provide the advantageous feature of additional electrolyte reservoir volume in the cells). According to other exemplary embodiments, the projections provided on the cells may be solid as opposed to hollow.

As will be appreciated by those reviewing the present disclosure, numerous advantages may be obtained using the exemplary embodiments shown herein. For example, terminals such as those shown in FIGS. 4A to 4C may be used to reduce parts and assembly costs associated with battery manufacture by eliminating relatively cumbersome bolted connections at the end terminals for battery modules.

As shown in FIGS. 5A to 5C, removal of effluent from a battery assembly may be facilitated using a manifold system that is coupled to individual battery modules within the assembly to remove effluent from the assembly. For example, openings or apertures in the manifold system may be aligned with and/or coupled to openings or apertures in the battery module to route the effluent to a point exterior to the vehicle to prevent buildup of effluent in the vicinity of the battery module and/or battery assembly.

It should be noted that references to "front," "back," "upper," and "lower" in this description are merely used to identify various elements as are oriented in the FIGURES, with "front" and "back" being relative to the environment in which the device is provided.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the battery system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present inventions as expressed in the appended claims.

What is claimed is:

1. A battery assembly comprising:
   a plurality of battery modules, each of the battery modules comprising a plurality of electrochemical cells having a first end comprising a terminal and a second end opposite the first end, the second end comprising an adapter having at least one aperture and arranged such that at least a portion of the adapter is provided in contact with at least a portion of a terminal of an adjacent electrochemical cell; and
   a device including at least one member aligned with the apertures in a plurality of the adapters to provide a path for effluent escaping the apertures;
   wherein the device is a tray that includes spaces for routing cooling air toward the battery modules; and
   wherein the device is configured to route effluent from the plurality of battery modules away from the battery assembly.

2. The battery assembly of claim 1 wherein the plurality of electrochemical cells in the battery modules are generally cylindrical cells arranged end to end to form sticks.

3. The battery assembly of claim 1 wherein the device includes a plurality of members aligned with apertures in a plurality of the adapters to provide a path for effluent escaping the apertures.

4. The battery assembly of claim 3 wherein the plurality of members are coupled to and in fluid communication with a structure for receiving effluent from the plurality of members.

5. The battery assembly of claim 1 wherein the device comprises a structure having at least one channel provided therein that is aligned with apertures in a plurality of the adapters such that effluent is routed through the channel.

6. The battery assembly of claim 5 wherein the at least one channel is provided in a wall on which the battery modules are supported.

7. A battery assembly comprising:
   a plurality of battery modules, each battery module comprising a plurality of electrochemical cells arranged end to end such that a terminal of each electrochemical cell is in contact with an adapter coupled to an end of an adjacent electrochemical cell, the adapter comprising at least one aperture for allowing effluent to escape the electrochemical cell to which it is coupled;
   a manifold provided adjacent the plurality of battery modules for routing effluent from electrochemical cells in each of the plurality of modules, the manifold including at least one member having features aligned with the apertures of a plurality of the adapters and wherein the member comprises a component of a battery tray having a channel provided therein;

wherein the manifold is configured to route effluent away from the battery assembly.

8. The battery assembly of claim 7 wherein each of the battery modules are provided in the form of a stick having a central longitudinal axis.

9. The battery assembly of claim 7 wherein the channel is aligned with the apertures of a plurality of the adapters.

10. The battery assembly of claim 9 wherein the component is configured for securing the battery modules in place.

11. The battery assembly of claim 10 wherein the component is a wall extending from a floor of a battery tray and includes cutouts for receiving the battery modules.

12. A battery assembly comprising:
a plurality of battery modules, each of the battery modules comprising a plurality of electrochemical cells arranged end to end to form cell sticks and a plurality of openings for allowing effluent to escape the battery modules, the openings provided in adapters coupled to ends of the plurality of electrochemical cells; and
a device for routing effluent from the battery modules to a location away from the battery assembly;
wherein the device is a tray configured to hold the plurality of battery modules and the tray includes features aligned with the openings in the plurality of battery modules to allow the effluent to flow into the tray.

13. The battery assembly of claim 12 wherein the features comprise channels provided in walls of the tray that are aligned with openings from a plurality of adapters.

14. The battery assembly of claim 13 wherein the plurality of adapters aligned with the channels are provided in adjacent battery modules.

15. The battery assembly of claim 12 wherein the openings of the battery modules for allowing effluent to escape the battery modules are provided in adapters coupled to cells of the battery modules.

16. The battery assembly of claim 1 wherein the tray comprises a top portion and a bottom portion.

17. The battery assembly of claim 1 wherein at least one of the electrochemical cells comprises a series of projections configured to increase the turbulence of cooling air flowing over the electrochemical cell.

18. The battery assembly of claim 2 comprising a plurality of sticks arranged side by side.

19. The battery assembly of claim 2 wherein at least one of the sticks comprises a sleeve substantially surrounding the stick.

20. The battery assembly of claim 7 wherein the battery tray comprises a top portion and a bottom portion.

21. The battery assembly of claim 7 wherein at least one of the electrochemical cells comprises a series of projections configured to increase the turbulence of cooling air flowing over the electrochemical cell.

22. The battery assembly of claim 8 comprising a plurality of sticks arranged side by side.

23. The battery assembly of claim 8 wherein at least one of the sticks comprises a sleeve substantially surrounding the stick.

24. The battery assembly of claim 12 wherein the tray comprises a top portion and a bottom portion.

25. The battery assembly of claim 12 wherein at least one of the electrochemical cells comprises a series of projections configured to increase the turbulence of cooling air flowing over the electrochemical cell.

26. The battery assembly of claim 25 wherein the projections have a generally rhomboid cross-section.

27. The battery assembly of claim 12 wherein at least one of the cell sticks comprises a sleeve substantially surrounding the cell stick.

* * * * *